United States Patent
Imfeld et al.

(10) Patent No.: US 10,132,648 B2
(45) Date of Patent: Nov. 20, 2018

(54) WHEEL AND METHOD FOR PRODUCING THE WHEEL

(71) Applicant: GWF MESSSYSTEME AG, Lucerne (CH)

(72) Inventors: Andreas Imfeld, Sarnen (CH); Martin Einsiedler, Lucerne (CH); Thomas Frey, Küssnacht am Rigi (CH); Samuel Hubacher, Madiswil (CH); Jörg Wyss, Lucerne (CH); Ralph Kayser, Lucerne (CH)

(73) Assignee: GWF MESSSYSTEME AG, Lucerne (CH)

( * ) Notice: Subject to any disclaimer, the term of this patent is extended or adjusted under 35 U.S.C. 154(b) by 0 days.

(21) Appl. No.: 15/519,848

(22) PCT Filed: Oct. 29, 2015

(86) PCT No.: PCT/EP2015/075122
§ 371 (c)(1),
(2) Date: Apr. 18, 2017

(87) PCT Pub. No.: WO2016/066745
PCT Pub. Date: May 6, 2016

(65) Prior Publication Data
US 2017/0241800 A1   Aug. 24, 2017

(30) Foreign Application Priority Data
Oct. 29, 2014   (EP) ..................... 14190876

(51) Int. Cl.
*G01D 4/00* (2006.01)
*B29C 45/16* (2006.01)
*B29C 45/72* (2006.01)
*B29L 31/32* (2006.01)

(52) U.S. Cl.
CPC ............. *G01D 4/004* (2013.01); *B29C 45/16* (2013.01); *B29C 45/7207* (2013.01); *B29L 2031/322* (2013.01)

(58) Field of Classification Search
None
See application file for complete search history.

(56) References Cited

U.S. PATENT DOCUMENTS

| 3,871,241 | A |   | 3/1975 | Pestka et al. |
| 4,012,961 | A | * | 3/1977 | Cameron ................ F16H 55/48 29/892 |
| 4,829,164 | A | * | 5/1989 | Rudolph ................. G06M 1/00 235/1 C |

FOREIGN PATENT DOCUMENTS

| DE | 4134431 A1 | 4/1993 |
| DE | 10116236 A1 | 10/2002 |
| DE | 102006026568 A1 | 12/2007 |

(Continued)

*Primary Examiner* — Kristy A Haupt
(74) *Attorney, Agent, or Firm* — William J. Clemens; Shumaker, Loop & Kendrick, LLP

(57) ABSTRACT

A wheel, in particular a counting wheel for a meter, includes a bearing bush and a wheel rim. The bearing bush and the wheel rim are produced from different materials. The bearing bush and the wheel rim can move relative to one another in the rotational direction through a guide having complementarily corresponding guide elements on the bearing bush and the wheel rim extending continuously in the circumferential direction of the counting wheel.

19 Claims, 4 Drawing Sheets

(56) References Cited

FOREIGN PATENT DOCUMENTS

| FR | 633998 | 2/1928 |
|---|---|---|
| WO | 9615380 A1 | 5/1996 |
| WO | 2012130304 A1 | 10/2012 |
| WO | 2014119281 A1 | 8/2014 |

\* cited by examiner

WHEEL AND METHOD FOR PRODUCING THE WHEEL

FIELD

The invention relates to a wheel, in particular a counting wheel for a meter, as well as to a method for producing the wheel.

BACKGROUND

Wheels in the sense of the present application essentially consist of a wheel rim and a bearing bush and can be designed, for example, as a number wheel or as a gearwheel for the construction of a numerical counter, such as, for example, in a water meter. The rim of the wheel encloses the mostly centrally arranged bearing bush, by means of which the wheel can be supported on an axle or shaft. The bearing bush frequently is made of a metal, while the wheel rim is made of a plastic. However, this combination of two different materials with deviating material properties, such as, for example, differing shrinkage behavior in the wheel, leads to wear phenomena, in particular between the bearing bush and the wheel rim or within the bearing bush.

It is known that the wear between the plastic of the wheel rim and the bearing bush can be reduced by using plastic bushings. For instance, WO 2012/130304 A1 describes a wheel with a toothed rim, in which both the toothed rim and the bearing bush are made of a composite material. The toothed ring and the bearing bush are connected to one another in a rotationally fixed manner by means of positively locking elements, the bearing bush being also mounted so as to slide on an axle. Admittedly, the use of the same basic material facilitates the production of the wheel. However, the material properties of the bearing bush and the toothed ring can be adapted only to a limited extent to their functions.

WO 96/15380 A1 also describes a wheel in the sense of the present invention with a wheel rim, made of a thermoplastic material, and discloses a bearing bush of the wheel consisting of a metal or of a plastic material. In the production process of the wheel, the wheel rim is first of all produced by casting the heated, thermoplastic material in a mold, the mold, in particular, having a central recess for the bearing bush and the prefabricated bearing bush being inserted into this central recess of the wheel rim during the cooling process. During the cooling process, the bearing bush is firmly enclosed by the wheel rim. Additional brackets on the wheel rim increase the connecting effect of the bearing bush within the recess of the wheel rim, so the bearing bush and the wheel rim are connected firmly with one another. This manufacturing process, in particular, has the disadvantage that the bearing bush must be prefabricated and additional brackets are required for a good hold of the bearing bush within the wheel rim.

The solutions in the above-mentioned prior art have the disadvantage that wear phenomena can occur at the bearing bush and the axle due to the rigid connection between the wheel rim and the bearing bush.

U.S. Pat. No. 4,012,961 has disclosed a deflection roller for a cable pull of textile curtains. The roller consists of two prefabricated plastic parts, the two plastic parts being made of the same material and the plastic parts have guide means in the form of an elevation, which is raised in cross-section, and a bulging molding, which can be brought into engagement therewith. The two parts are connected to one another by compression, as a result of which a snap-on or latching connection is provided. The inner plastic part and the outer plastic part are then rotatably movable relative to one another in the direction of rotation relative to the guide extending in the direction of rotation. The production of the roller is costly. The handling of the semi-finished products, that is, the comparatively small prefabricated plastic parts, is also not easy. Furthermore, it is possible that the roller may break in use in the event of mechanical loads acting in the axial direction. The snap or latching connection finally also has the disadvantage that a precise positioning of the two plastic parts relative to one another is not ensured, particularly in the case of mass production. A wheel manufactured in the manner described is therefore also not suitable as a counting wheel for a meter.

SUMMARY

It is therefore an object of the invention to overcome the disadvantages of the prior art and to provide a wheel, particularly a counting wheel for a meter of the type mentioned at the outset, which has low wear between the wheel rim and the bearing bush and is easy to produce and cost-effective.

The wheel comprises an outer wheel rim and an inner bearing bush, wherein the bearing bush and the wheel rim comprise different materials and the bearing bush and the wheel rim are rotatable relative to each other in the direction of rotation of the wheel via a guide extending between the wheel rim and the bearing bush in the direction of rotation. The guide preferably is designed to be continuous along the direction of rotation or in the circumferential direction. Such an arrangement has the advantage that, because of the rotatability of the bearing bush in relation to the wheel rim, the bearing bush can be connected in a rotationally fixed manner with an axle, or that wear phenomena can be minimized within the wheel or the bearing bush in comparison to that of an axle lying in the bearing bush and the service life of the wheel is lengthened. Additional and separate bearing bushes are no longer necessary. The bearing bushes, designed as injection molded parts, and the wheel rim are each made from a different plastic.

When the bearing bush and the wheel rim are undetachably connected to the guide, an advantageous wheel may be created, which can withstand even greater mechanical stresses.

In a preferred embodiment of the invention, the guide between the wheel rim and the bearing bush has guide elements, the guide elements preferably being configured as at least one molding and one indentation complementary to the molding, the molding and the indentations being in operative connection with one another and preferably engaging one another. The advantage of the guide elements being in operative connection lies therein that the bearing bush and the wheel rim remain connected reliably with one another and that high precision and a smooth running of the wheel are made possible.

Preferably, in each case a first guide element is formed as a component of the bearing bush or of the wheel rim, and a second guide element, complementary to the first guide element, is a component of the wheel rim or of the bearing bush.

Furthermore, the bearing bush and/or the wheel rim are formed in one piece, which ensures cost-effective production with a low material expenditure, since manufacture is possible in a single step. In addition, homogeneous components with uniform material properties can be provided by manufacturing the bearing bush and the wheel rim each in one piece.

In one embodiment, it is furthermore provided that the guide is configured along the direction of rotation of the wheel by means of a cross-sectional shape of the first guide element and a corresponding cross-sectional shape of the second guide element, which is complementary to the cross-sectional shape.

The guide elements may each have a polygonal cross-sectional shape, the guide elements each preferably having a cross-section with a triangular contour. Advantageously, a triangular cross-sectional shape of the first guide element and a cross-sectional shape of the second guide element complementary thereto, are provided for this purpose. Other polygonal cross-sectional shapes, for example, rectangular or trapezoidal contours or also alternating cross-sectional shapes, such as T-shaped contours or corresponding cross-sectional shapes complementary thereto, are also conceivable.

A particularly secure connection between the bearing bush and the wheel rim can be achieved if the guide elements, contoured triangularly in cross-section, are designed to be acute-angled or if the guide elements, contoured triangularly in cross-section, have guide surfaces, which extend at an acute angle towards one another.

With the inventive wheel, a gap with a defined width can also remain between the bearing bush and the wheel rim. In particular, a gap of defined width warrants that the running ability with respect to the entire running surface between the wheel rim and the bearing bush is ensured and also that imbalances, which, in turn, lead to increased wear of the wheel, do not occur along the entire direction of rotation, if the width of the gap remains constant. The preferred width of the gap is between 0.01 and 0.1 mm, particularly between 0.04 and 0.07 mm and preferably 0.05 mm, for thermoplastic materials, when the wheel is at rest. In an operating position, during which the bearing bush and wheel rim move relatively to one another, the width of the gap may deviate from the width defined for the position at rest. The aforesaid position at rest, for example, is provided after the wheel or the process for producing the wheel is completed; the gap is determined particularly by the manufacturing process and can vary during operation due to the effect of external forces or temperature. Furthermore, the gap of constant width ensures the rotatability of the wheel rim relative to the bearing bush, as a result of which the effect of the force on the bearing bush is minimized and the service life of the wheel is lengthened in comparison to that of known wheels.

At least one of the materials of the bearing bush and/or of the wheel rim may be a thermoplastic. The use of thermoplastic materials has the advantage that these are readily deformable and have a high wear resistance, in particular in the case of mechanical stresses. The wheel rim and/or the bearing bush preferably are made of polyoxymethylene (POM), polyphenylene oxide (PPO), polyamide (PA), polyimide (PI), polyurethane (PUR) or polytetrafluoroethylene (PTFE). POM is characterized by a high stiffness and low friction. In addition, POM has a high abrasion resistance and good dimensional stability, which means that the material changes little if at all under changing ambient conditions. PPO is an amorphous and very cost-effective material, which is easy to process. PPO, moreover, is distinguished by a high mechanical and chemical stability and withstands extreme temperature fluctuations. Combinations of the various thermoplastic materials mentioned above may also be used as a material for the bearing bush and/or the wheel rim.

Other material combinations, such as, for example, a wheel rim made of a thermoplastic material in combination with a metallic bearing bush, are likewise included in the subject matter of the present invention.

It is especially preferred if the bearing bush is made from polyoxymethylene (POM) and the wheel rim is made for polyphenylene oxide (PPO). Hostaform® C 9021, obtainable from Ticona Celanese, is used for production of the bearing bush and Noryl™ Resin 731 granulate, obtainable from SABIC, is used for the wheel rim.

In a further preferred embodiment of the present invention, it is provided that the connection and friction properties can be changed within the gap between the wheel rim and the bearing bush. By selectively affecting the connection and friction properties within the gap during the manufacturing process and/or during the operation, the rotational characteristics of the wheel rim relative to the bearing bush can be optimized either during the production process and/or during the operation as a function of the size of the torque on the wheel rim and/or on the bearing bush. Within the scope of the manufacturing process, the connection and friction properties can be modified, for example, by selectively controlling the temperature or by introducing further additives into the gap. Roughened surfaces within the gap increase the friction and thus lead to a reduction in the rotatability of the bearing bush relative to the wheel rim. Conversely, the introduction of additives with lubrication properties leads to a reduction in friction and, with that, to an increase in the rotatability of the wheel rim relative to the bearing bush. The introduction of additives into the gap may also take place during the operation of the wheel by means of suitable measures or devices.

In an advantageous configuration of the wheel, provisions are made so that that an evaluation device may be disposed at the wheel and the numerical value, represented by the position of the wheel, can be determined by the evaluating device. The evaluation device, which preferably is disposed at the side, may generate, in particular, a light pulse, wherein the beam path of the light pulse can be measured or changed as a result of the position and/or shape and/or position and/or length of recesses on the wheel and is a measure of the numerical value represented by the position of the wheel.

A further aspect of the invention relates to a method for producing a wheel, in particular a counting wheel for a meter, as described herein, in which a first molded part is provided for producing a wheel rim. Thereafter, a first, heated plastic is injected into the first molded part for producing the wheel rim with a first guide element. Furthermore, a further molded part, for producing a bearing bush, is provided, in which a second guide element, corresponding to the first guide element, is injection-molded for producing a bearing bush. The first and the second guide element then form a guide, which extends in the direction of rotation, by means of which the wheel rim and the bearing bush are rotatably movable relative to one another in the direction of rotation.

Preferably, the guide is continuous and runs in the direction of rotation of the wheel. The manufacturing method described has the advantage that the wheel, with a wheel rim, bearing bushing and guide elements, so produced, can be produced easily and cost-effectively in a two-stage injection molding process. The molded parts may be components of a larger mold, which can be put together, in each case their own molds or also other components, which, upon cooling, give the injection molded or molded on material a shape during and after the cooling.

Furthermore, the molded parts may comprise a female mold and a core, preferably a second core, for molding at least one element of the guide. By means of such a manufacturing process with a female mold and a two-part core as separate molded parts, the wheel rim and the bearing bush may each be produced in one piece and cost-effectively in the context of an injection molding process. Separate moldings are not necessary and individual components of the wheel need not be produced and assembled separately.

Pursuant to the invention, the second material preferably is sprayed onto a completely cooled or possibly still warm wheel rim. By cooling the second material, the gap between the two elements, that is, between the wheel rim and the bearing bush, can be produced automatically. When the second material for the bearing bush is being cooled, the bearing bush enters into the desired rotatable connection with the wheel rim without the need for downstream mounting steps. Preferably, the core has the contour of the guide elements, as a result of which the wheel rim already has the contour of a first guide element after the first injection molding process. In the next step, the core is removed and, for example, replaced by a core of smaller diameter. The second material for forming the bearing bush may now be injected with a second guide element into the remaining openings of the wheel rim, which are provided for this purpose.

Alternatively, in the case of fast-curing materials, a layer of the fast-curing material may be applied in the openings of the wheel rim as a molded part, which takes the form of the openings directly and thus produces the bearing bush without the use of further molded parts.

By using materials with different processing shrinkages for the wheel rim and for the bearing bush, a gap is formed between the wheel rim and the bearing bush due to the higher processing shrinkage of the bearing bush in comparison to the processing shrinkage of the wheel rim. As a result, the material of the bearing bush shrinks more during the cooling process than does the material of the wheel rim and the gap between the wheel rim and the bearing bush is produced thereby. This has the further advantage that the gap is produced cost-effectively and without additional production expenditures during manufacture during the cooling of the wheel. As thermoplastic materials, preferably polyoxymethylene (POM), polyphenylene oxide (PPO), polyamide (PA), polyimide (PI), polyurethane (PUR) or polytetrafluoroethylene (PTFE) may be used. The use of such thermoplastic materials has the advantage that they withstand the material requirements of the functions of the bearing bush and the wheel rim and thus increase the service life of the wheel.

In a further advantageous embodiment of the invention, the temperature or the temperature gradient during the cooling of the wheel rim and/or the bearing bush is adapted with regard to the respective processing shrinkages of the materials used. The connection and friction properties within the gap between the wheel rim and bearing bush can also be varied selectively in this phase of the production process by introducing selected additives.

A further aspect of the invention relates to a meter, wherein the meter comprises at least one wheel as described herein, and the wheel may additionally be printed with numbers on the periphery in the direction of rotation and can thus be designed as a counting wheel. Engraved or molded numbers are also conceivable. The meter may also include two or more wheels. Such a meter has the advantage that it can withstand fluctuating environmental conditions and is characterized by a long service life. It is low-maintenance, convenient to manufacture and has a high level of precision and can be installed especially in water or gas meters.

DESCRIPTION OF THE DRAWINGS

Further advantageous refinements and embodiments arise from the following Figures and the invention is explained in more detail below with reference to examples.

DETAILED DESCRIPTION

Figure 1:
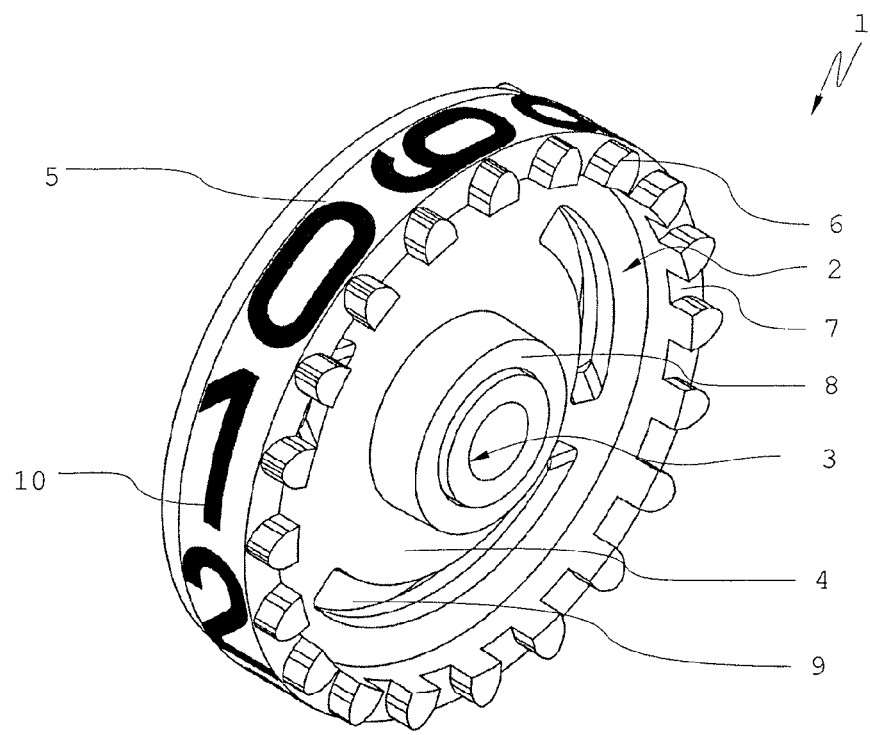
FIG. 1: shows an inventive counting wheel for meters in a perspective representation.

FIG. 1 shows an inventive counting wheel 1 for a meter in a perspective representation, comprising a wheel rim 2 and a bearing bush 3. The wheel rim 2 is made, for example, of Noryl™ 731 granulate and the bearing bush 3 is made of Hostaform® C 9021 material. The wheel rim 2 consists of an inner part 4 and an outer edge 5. On one side 7 of the outer edge 5, a gear rim 6 is arranged for installation in a transmission. A hub 8 is disposed in the inner part 4 of the wheel rim 2. The bearing bush 3 is integrated into this hub 8. The inner part 4 of the wheel rim 2 has recesses 9. There are printed members 10 on the outer edge 5.

Figure 2:
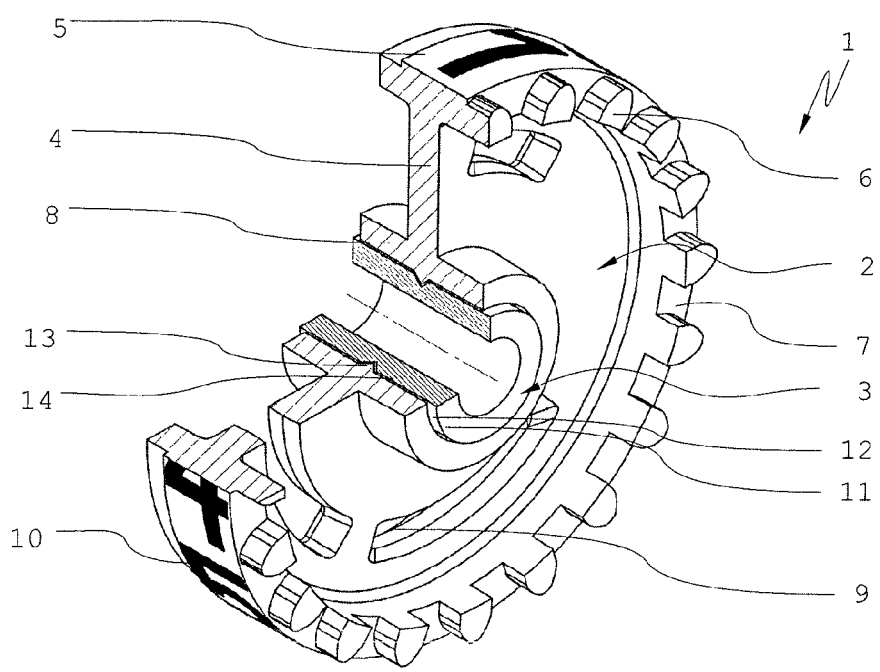
FIG. 2: shows the counting wheel of FIG. 1 in a partially cut-away view.
Figure 3:
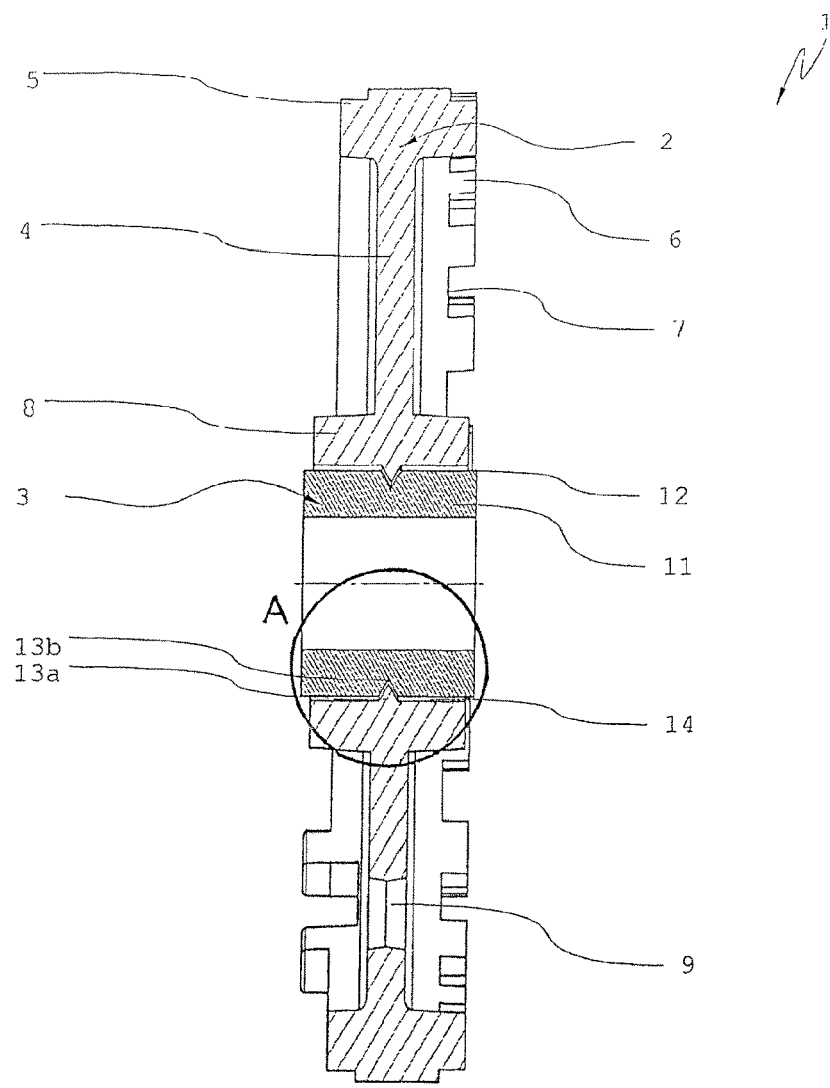
FIG. 3: shows and inventive counting wheel in a sectional view.

FIG. 2 shows the meter wheel 1 of FIG. 1 in a partially cut-away view with the wheel rim 2 consisting of the inner part 4, the outer edge 5, the side 7 bearing the toothed rim 6, the hub 8 as well as the recesses 9 and the bearing bush 3. The different plastics of the bearing bush 3 and the wheel rim 2 are characterized by different shading. The wheel rim 2 is made in one piece. The bearing bush 3 has a cylindrical shell 11, on which a sliding surface 12 of the bearing bush 3 is formed. The bearing bush 3 is also formed in one piece. A guide 13 between the wheel rim 2 and bearing bush 3 can be seen in the center of the counting wheel 1. This guide 13 is arranged continuously in the circumferential direction of the counting wheel 1. The guide 13 has complementarily corresponding guide elements 13a, 13b with a triangular contour. These guide elements 13a, 13b consist of a molding 13a of FIG. 3 and an indentation 13b, as shown in FIG. 3. A gap 14, which allows the bearing bush 3 and the wheel rim 2 to rotate with respect to one another, remains. The wheel rim 2 and the bearing bush 3 are connected to one another inseparably, that is to say that they cannot be separated from one another in a nondestructive manner. Numbers 10 are printed on the outer edge 5 of the wheel rim 2.

FIG. 3 shows the counting wheel 1 of FIGS. 1 and 2 in a sectional view. Identical reference numbers denote the same parts as in FIGS. 1 and 2. The guide 13, as shown in FIG. 2, consists of guide elements 13a, 13b in the form of a protrusion 13a for the molding and a notch 13b for the indentation. The indentation 13b is disposed on the bearing bush 3 and is connected therewith in one piece. The molding 13a is disposed on the wheel rim 2 and is connected therewith in one piece. However, it is also conceivable that the indentation 13b is disposed on the wheel rim 2 and the molding 13a is disposed at the bearing bush 3. The molding 13a and the indentation 13b are complementary to one another and each has a triangular contour or a corresponding contour, which is complementary thereto. A gap 14 remains between the wheel rim 2 and the bearing bush 3.

Figure 3A:
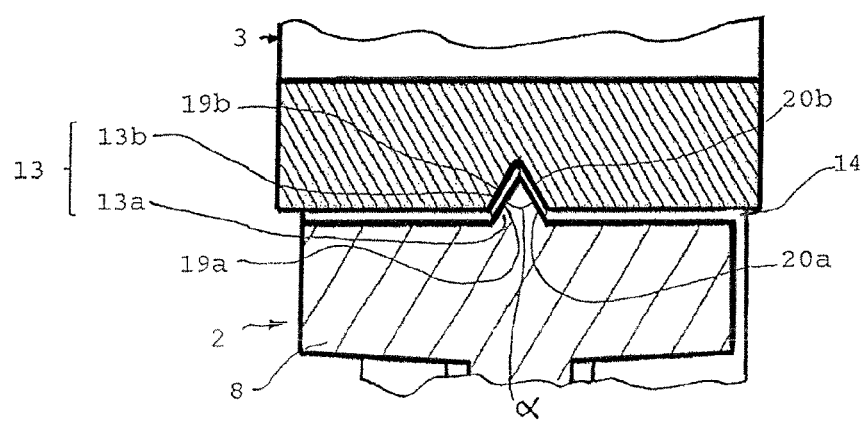
FIG. 3A: shows an enlarged view of details of the counting wheel of FIG. 3 (Section A of FIG. 3)

It can be seen from the detailed view of FIG. 3A that the guide elements 13a and 13b, which are contoured triangularly in cross-section, are in each case designed with an acute angle. The molding 13a, which is triangular in cross-section, has two planar guide surfaces 19a and 20a. The guide surfaces 19a and 20a of this guide element 13a converge towards one another at an acute angle, the angle between the guide surfaces 19a and 20a being designated by α. In the present case, the angle α is approximately 60°, but it can also be between 20° and 90°. For certain applications, even configurations with an obtuse angle are conceivable. The counterpart to the molding 13a, the indentation 13b forming the notching, obviously is complementary to the triangular molding 13a; the planar, tapering guide surfaces of the indentation 13b are designated 19b and 20b. With this embodiment of the guide elements 13a and 13b, the bearing bush 3 and the wheel rim 2 are undetachably connected with one another via the guide 13. Undetachably means that the two parts, that is to say the bearing bush 3 and the wheel rim 2, can be separated only with considerable effort and, in particular, not easily, by hand. In particular, the bearing bush 3 and the wheel rim 2 cannot be separated from one another in a non-destructive manner.

Figure 4:
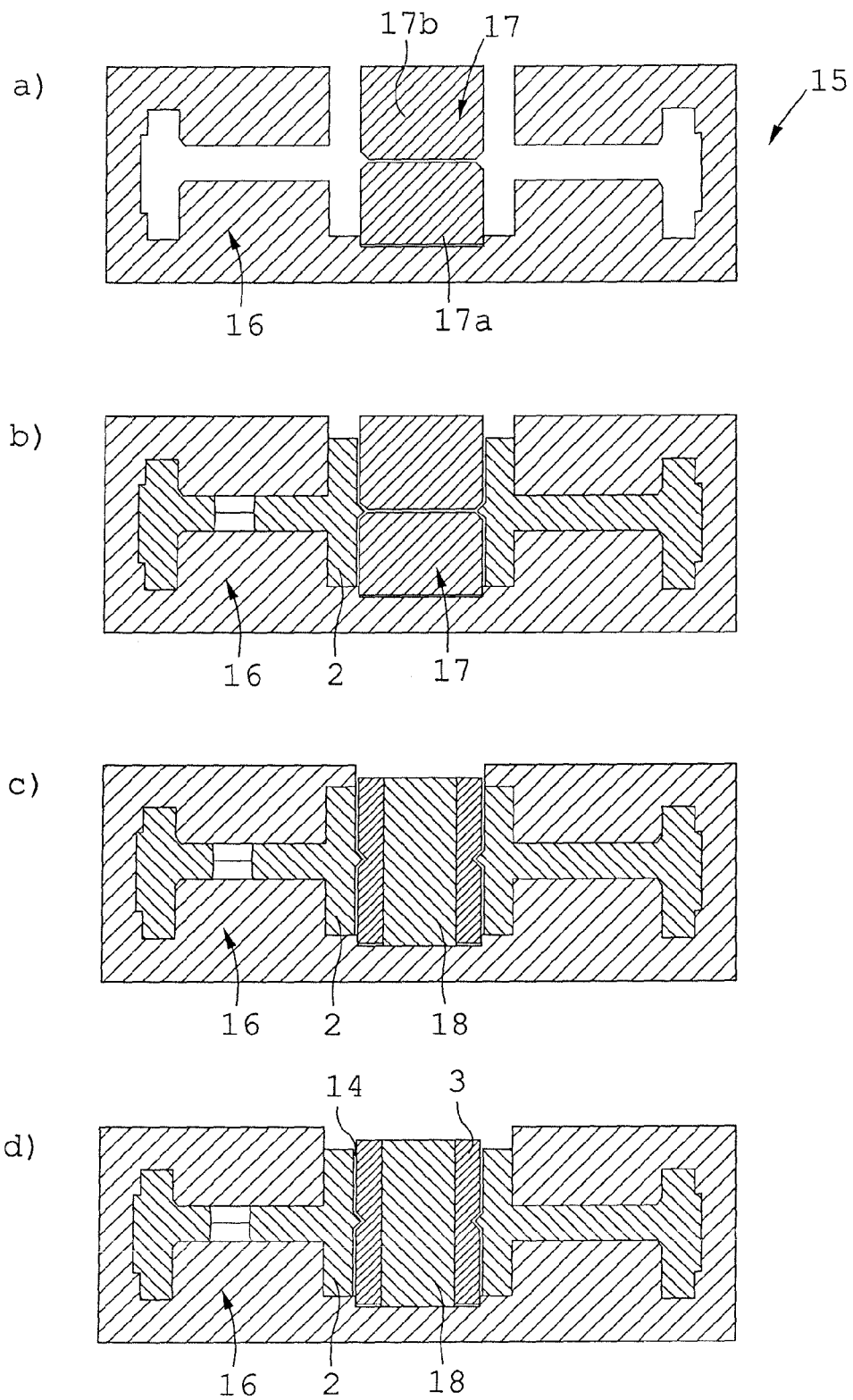
FIG. 4: shows an inventive method in a simplified representation and in a sectional view.

In steps a to d, FIG. 4 shows an inventive method for producing the wheel rim 2 and the bearing bush 3 by means of injection molding in a simplified representation and in a sectional view. To produce the wheel, a mold 15 of FIG. 4 step a is used, which comprises a female mold 16 and a core 17 consisting of two parts 17a and 17b. First of all, the plastic is injected between the female mold 16 and the core 17 to form the wheel rim 2 (FIG. 4 step b). Thereafter, the core 17 is removed and replaced by a core 18 of narrower diameter, as can be seen in FIG. 4 step c. The plastic for the formation of the bearing bush 3 can now be injected into the plastic for the formation of the wheel rim 2, that is to say, into the cavity between the narrow core 18 and the still warm wheel rim 2 (FIG. 4 step d). By means of selecting appropriate material and processing parameters, it can be ensured that the two materials do not combine and the advantageous rotatable bearing is achieved. The different plastics have different processing shrinkages. The processing shrinkage of the plastic of the bearing bush 3 is greater than that of the wheel rim 2, that is, during the cooling of the plastics, the bearing bush 3 shrinks more than does the wheel rim 2, as a result of which the gap 14 is produced with a particularly preferred width of 0.05 mm. After the plastics have cooled down, the narrow core 18 is removed from the wheel (not shown). Of course, depending on the materials selected and the dimensions and/or the applications, it is also possible to deviate from the above-mentioned particularly preferred gap width of 0.05 mm. An advantageous wheel can have a gap width of 0.01 to 0.1 mm in the case of a measurement in the position at rest, a gap width of 0.04 to 0.07 mm being preferably provided.

Figure 5:
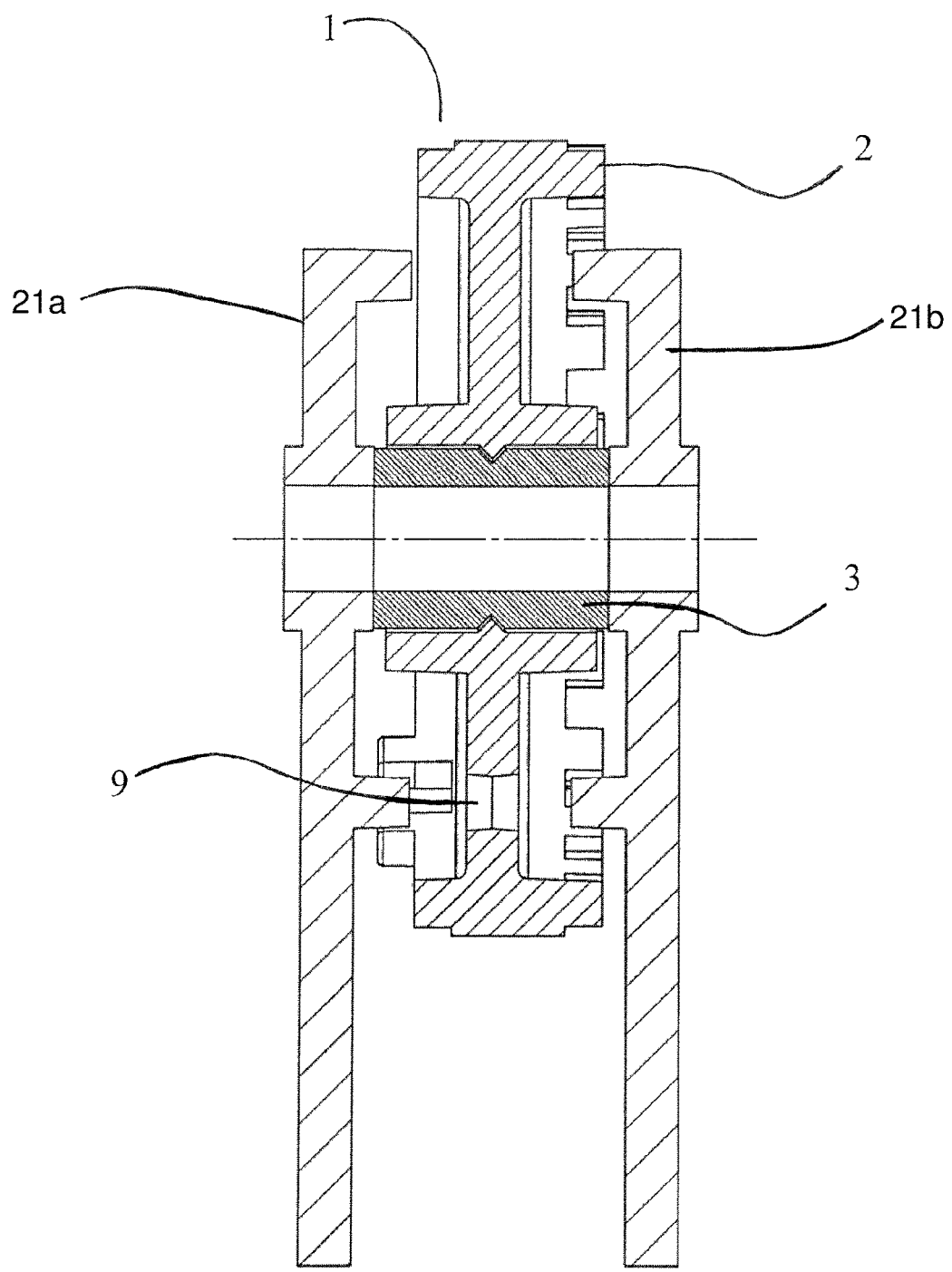
FIG. 5: shows a sectional drawing of the wheel with a laterally disposed evaluation unit.

FIG. 5 shows a sectional drawing of the wheel 1 with the evaluation device 21a, 21b disposed laterally. The evaluation device 21a, 21b is used to read the numerical value indicated in each case by the position of the wheel 1, which can represent a numerical value of a counting wheel, for example, of a water meter. The evaluation device 21a, 21b preferably is an optical transmitting unit 21a and a receiving unit 21b, which, by means of the evaluation of the position and/or shape and/or arrangement and/or length of the recesses 9 of the wheel 1, disposed along the direction of rotation, determines the numerical value represented by the position of the wheel 1. The recesses 9 preferably are arranged on the wheel rim 2, but can also be arranged on the bearing bush 3 or on the outer edge 5 of the wheel 1. Several wheels 1, disposed along an axis, can also be read in each case or altogether by means of an evaluation device 21a, 21b, which device is disposed directly at the respective wheels 1, or by a complete evaluation device 21a, 21b. The transmitting unit of the evaluating device 21a can also be part of the axis, for example, as a light guide, and send a light pulse through the bearing bush 3 and, due to the position of the bearing bush 3, possibly through likewise disposed recesses 9, determine the hereby represented numerical value. Other functional principles of the evaluation device 21a, 21b, such as capacitive or inductive methods, are also applicable according to the present invention. For this purpose, the recesses 9 must be replaced or compensated by corresponding capacitive and/or inductive signal generators or components.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A counting wheel comprising:
an outer wheel rim;
a bearing bush, wherein the bearing bush and the wheel rim are formed as injection-molded parts made of different plastic materials;
a guide connecting the bearing bush and the wheel rim and allowing relative rotatable movement between the bearing bush and the wheel rim; and
an evaluation device disposed on the wheel for determining a numerical value represented by a rotational position of the wheel, wherein the evaluation device generates a light pulse, wherein a beam path of the light pulse can be measured or changed by at least one of position, shape and length of recesses on the wheel, and the beam path is a measure of the numerical value represented by the rotational position of the wheel.

2. The wheel according to claim 1 wherein the bearing bush and the wheel rim are connected detachably to one another by the guide.

3. The wheel according to claim 1 wherein the guide includes a pair of guide elements that engage one another, one of the pair of guide elements being a molding and another of the pair of guide elements being an indentation complementary to the molding.

4. The wheel according to claim 3 wherein the one guide element is formed as an associated component of the bearing bush or of the wheel rim, and the another guide element, being complementary to the one guide element, is formed as an associated component of the wheel rim or of the bearing bush respectively, and wherein at least one of the bearing bush and the wheel rim is formed in one piece with the associated component.

5. The wheel according to claim 3 wherein the guide elements each have a polygonal cross-sectional.

6. The wheel according to claim 3 wherein each of the guide elements has a contour that is triangular in cross section.

7. The wheel according to claim 6 wherein the guide elements are of acute-angled contour.

8. The wheel according to claim 1 wherein the bearing bush and the wheel rim are separated by a gap having a width in a range of 0.01 mm to 0.1 mm.

9. The wheel according to claim 1 wherein the plastic material of at least one of the wheel rim and the bearing bushing is a thermoplastic material being one of polyoxymethylene (POM), polyphenylene oxide PPO), polyamide (PA), polyimide (PI), polyurethane (PUR) and polytetrafluoroethylene (PTFE).

10. The wheel according to claim 1 wherein the plastic material of the bearing bush has a higher processing shrinkage than the plastic material of the wheel rim.

11. The wheel according to claim 1 wherein the bearing bush is made of POM material and the wheel rim is made of PPO material.

12. The wheel according to claim 1 with a gap between the bearing bush and the wheel rim, wherein the wheel is formed by a method comprising the following steps:
   producing the wheel rim by injecting a first plastic material into a mold;
   producing the bearing bush by injecting a second plastic material different from the first plastic material onto the wheel rim in the mold, wherein the first and second plastic materials have different processing shrinkages; and
   producing the gap between the wheel rim and the bearing bushing by the second plastic material having a shrinkage greater than the first plastic material when the first and second plastic materials are being cooled.

13. A meter having at least one of the wheel according to claim 1 as a counting wheel.

14. A method for producing a counting wheel, the wheel having an outer wheel rim and an inner bearing bush, wherein the bearing bush and the wheel rim are rotatable relative to one another in a direction of rotation of the wheel by a guide extending between the wheel rim and bearing bush in the direction of rotation, the method comprising the steps of:
   providing a mold with a first core for producing the wheel rim;
   injecting a heated first plastic material into the mold to produce the wheel rim with a first guide element of the guide;
   providing the mold with a second core in exchange for the first core for producing the bearing bush;
   injecting a heated second plastic material into the mold to produce the bearing bushing with a second guide element of the guide being complementary to the first guide element; and
   wherein the second plastic material is different from the first plastic material.

15. The method according to claim 14 wherein the first and second plastic materials have different processing shrinkages, whereby a gap is formed between the wheel rim and the bearing bushing because the processing shrinkage of the second plastic material is higher than the processing shrinkage of the first plastic material.

16. The method according to claim 14 wherein the first and second plastic materials are thermoplastic materials selected from polyoxymethylene (POM), polyphenylene oxide (PPO), polyamide (PA), polyimide (PI), polyurethane (PUR) and polytetrafluoroethylene PTFE).

17. The method according to claim 14 including selectively varying connecting properties and friction properties within the gap between the wheel rim and the bearing bush by introducing at least one selected additive during the production of the counting wheel.

18. The method according to claim 14 including adjusting a temperature or a temperature gradient during cooling of at least one of the wheel rim and the bearing bush with regard to respective processing shrinkages of the first and second plastic materials.

19. A counting wheel comprising:
   an outer wheel rim;
   a bearing bush, wherein the bearing bush and the wheel rim are formed as injection-molded parts made of different plastic materials with a gap between the bearing bush and the wheel rim; and
   a guide connecting the bearing bush and the wheel rim and allowing relative rotatable movement between the bearing bush and the wheel rim,
   wherein the wheel is formed by a method comprising the following steps;
   producing the wheel rim by injecting a first plastic material into a mold;
   producing the bearing bush by injecting a second plastic material different from the first plastic material onto the wheel rim in the mold, wherein the first and second plastic materials have different processing shrinkages; and
   producing the gap between the wheel rim and the bearing bush by the second plastic material having a shrinkage greater than the first plastic material when the first and second plastic materials are being cooled.

* * * * *